(12) United States Patent
Kim et al.

(10) Patent No.: US 11,757,559 B2
(45) Date of Patent: Sep. 12, 2023

(54) COLLABORATIVE SIGNAL JAMMING DETECTION

(71) Applicant: Ford Global Technologies, LLC, Dearborn, MI (US)

(72) Inventors: Yu Seung Kim, San Jose, CA (US); Yun Ho Lee, Pleasanton, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 17/408,199

(22) Filed: Aug. 20, 2021

(65) Prior Publication Data

US 2023/0057179 A1 Feb. 23, 2023

(51) Int. Cl.
*G01S 19/21* (2010.01)
*H04K 3/00* (2006.01)
*H04W 4/46* (2018.01)

(52) U.S. Cl.
CPC ............... *H04K 3/22* (2013.01); *G01S 19/21* (2013.01); *H04W 4/46* (2018.02)

(58) Field of Classification Search
CPC ....... H04K 3/22; H04K 2203/22; H04W 4/46; H04W 4/44; H04W 4/48; G01S 19/21; G01S 19/215
See application file for complete search history.

(56) References Cited

U.S. PATENT DOCUMENTS 8,175,573 B2 5/2012 D'Avello et al.
9,363,642 B2 6/2016 Fischer et al.
2011/0151795 A1* 6/2011 D'Avello ............... H04K 3/825
  455/63.3
2018/0242115 A1 8/2018 Laeyoung et al.
2018/0242190 A1 8/2018 Alexey et al.

FOREIGN PATENT DOCUMENTS

JP 2009253688 A * 10/2009

OTHER PUBLICATIONS

M. Hasan "Securing Vehicle-to-Everything (V2X) Communication Platforms" (Mar. 2020).
F. M. Aziz "Resilience of Lte Networks Against Smart Jamming Attacks: a Game-Theoretic Approach" (Aug. 2017).

* cited by examiner

*Primary Examiner* — Keith Ferguson
(74) *Attorney, Agent, or Firm* — Brandon Hicks; Eversheds Sutherland (US) LLP

(57) ABSTRACT

A method for detecting communication jamming attacks includes collecting, via a processor associated with a base station, local jamming information from a first vehicle and a second vehicle. The local jamming information having an attack time, an attack localization, and an attack frequency. The method further includes building a global jamming map comprising global jamming information, based on the local jamming information, determining, based on the global jamming map, a location of a communication jamming device, and causing to transmit global jamming information to a third vehicle. The global jamming information is associated with the location of the communication jamming device.

20 Claims, 7 Drawing Sheets

COLLABORATIVE SIGNAL JAMMING DETECTION

TECHNICAL FIELD

The present disclosure relates to vehicle to vehicle and infrastructure to vehicle wireless communications, and more particularly, to collaborative signal jamming detection and mitigation using collaborative PC5 interface connections.

BACKGROUND

In LTE-V2X communications implemented in vehicle to vehicle (V2V) and vehicle-to-infrastructure (V2I), and vehicle-to-anything (V2X) data sharing, the data transmission channels are often established using two communications interfaces: a Universal Mobile Telecommunications System (UMTS) Air Interface (hereafter "Uu interface") connecting a base station to vehicles (e.g., V2I), and a PC5 interface connecting vehicle-to-vehicle (e.g., V2V).

While the Uu interface is controlled by a base station computing system, current V2V protocols do not include a centralized control mechanism in the PC5 interface, which may be shared by surrounding vehicles. Before transmitting any message over the PC5 interface, each vehicle has to sense the channel interface to check whether it is being used by other vehicles. If it is determined that the channel interface is used by others, then the vehicle typically defers its transmission until the channel becomes free or tries to find another available channel resource block(s) for the transmission.

A malicious attacker may be able to occupy the channel interface by constantly transmitting over it, which is broadly defined as a term "jamming." The wireless coverage of Uu is much larger than wireless coverage associated with a PC5 interface device, and thus, Uu jamming can be easily detected by the base station computing system. It may be advantageous to detect the local signal jamming activities over a PC5 interface in a collaborative manner.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

The disclosure will be described more fully hereinafter with reference to the accompanying drawings, in which example embodiments of the disclosure are shown, and not intended to be limiting.

Disclosed are systems and methods for detecting signal jamming in LTE-V2X communications for vehicles. An example method may first involve collecting local jamming information from individual vehicles at a base station via an LTE-Uu interface. The local jamming information may include a resource block spectrogram showing observed signal strength in time-frequency space, and GPS coordinate traces corresponding to each resource block.

Second, global jamming mapping may be performed. The base station may build a global jamming map based on the collected information. For example, local jamming reports from multiple vehicles pointing to a similar geographical coordinate may suggest the location of a stationary jammer. Multiple jamming reports from a group of vehicles within a close geographical distance observing persistent channel occupancy may suggest the existence of a mobile jammer in the vicinity.

Third, jamming information may be disseminated. The base station may provide determined jamming information to individual vehicles for jamming avoidance purposes via the Uu interface. For example, the base station may send jamming information about the location of jammers to approaching vehicles, so they do not attempt to waste radio resources.

Figure 1:
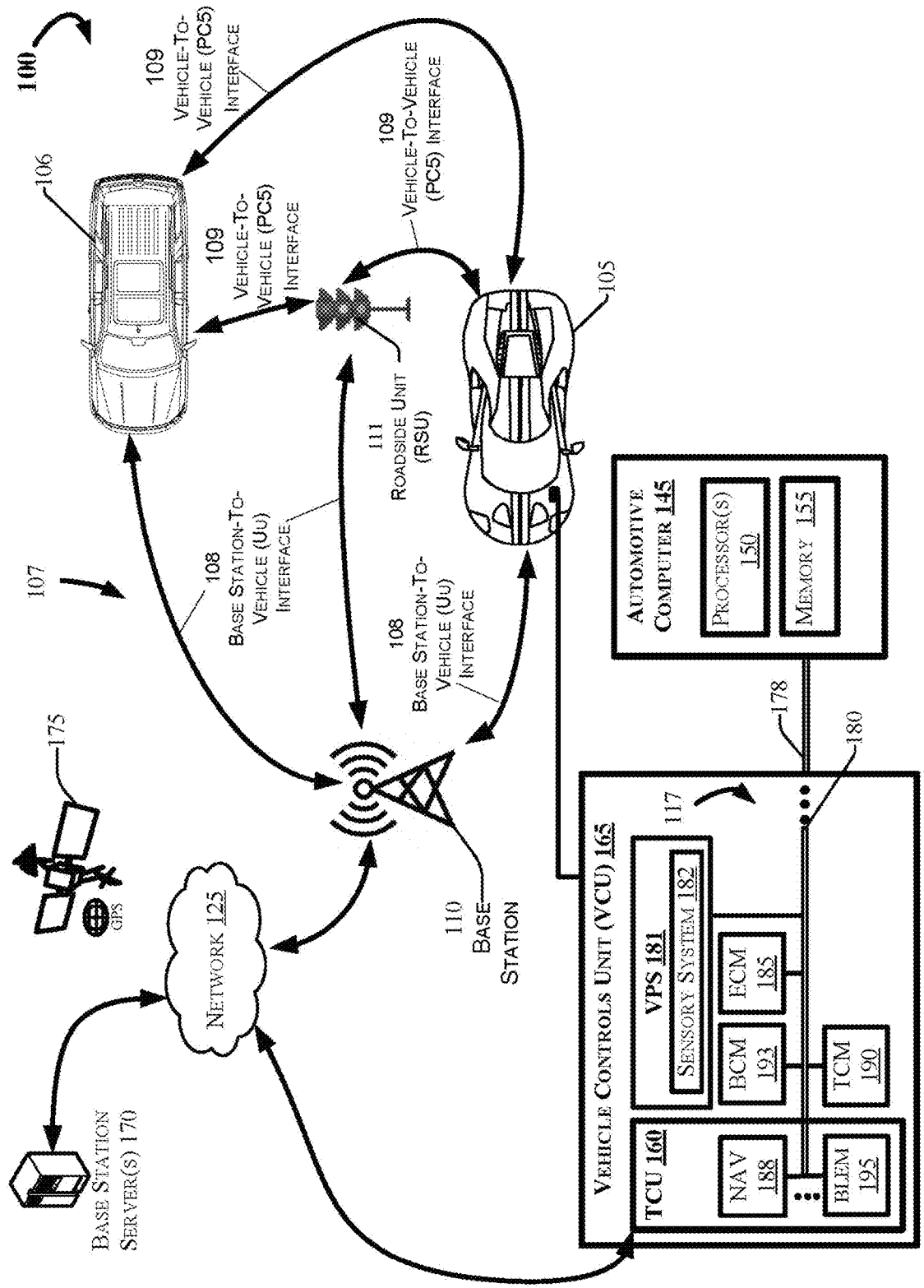
FIG. 1 depicts an example computing environment in which techniques and structures for providing the systems and methods disclosed herein may be implemented.

FIG. 1 depicts an example computing environment 100 that can include any number of data-connected vehicles including, for example, a first vehicle 105 and a second vehicle 106. Although each of the vehicles 105 and 106 are not described explicitly, it should be appreciated that any vehicle (e.g., 105, 106, etc.) may include similar features, infrastructure, and communication equipment usable for implementing one or more embodiments described herein.

As an example of a data-connected vehicle, the vehicle 105 may include an automotive computer 145, and a Vehicle Controls Unit (VCU) 165 that can include a plurality of electronic control units (ECUs) 117 disposed in communication with the automotive computer 145. The vehicle 105 may also receive and/or be in communication with a Global Positioning System (GPS) 175.

The GPS 175 may be a satellite system (as depicted in FIG. 1) such as the global navigation satellite system (GNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized. The GPS 175 may include information indicative of a real-time position of the vehicle 105. In some aspects, the GPS 175 may provide information usable for generation and transmission of a GPS trace or series of GPS traces that indicate vehicle localization information with respect to time. For example, the vehicle 105 may generate a GPS coordinate trace having time information associated with one or more GPS positions that may be further associated with local jamming information detected by the vehicle 105.

The automotive computer 145 may be or include an electronic vehicle controller, having one or more processor(s) 150 and memory 155. The automotive computer 145 may, in some example embodiments, be disposed in communication with one or more server(s) 170. The server(s) 170 may be part of a cloud-based computing infrastructure, and may be associated with and/or include a Telematics Service Delivery Network (SDN) that provides digital data services to the vehicle 105 and other vehicles (e.g., vehicle 106) that may be part of a vehicle fleet (not shown in FIG. 1).

Although illustrated as a high-performance vehicle, the vehicle 105 may take the form of another passenger or commercial automobile such as, for example, a car, a truck, a sport utility, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in REV (PHEV) that includes a REV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), LTE-V2X, Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the collaborative jamming detection system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a collaborative jamming detection program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a data/power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, among other ECUs 117. The VCU 165 may further include and/or communicate with a Vehicle Perception System (VPS) 181, having connectivity with and/or control of one or more vehicle sensory system(s) 182.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the collaborative jamming detection system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the collaborative jamming detection system 107, and/or via wireless signal inputs received via the wireless connection(s) 133 from other connected devices. The ECUs 117, when configured as nodes in the bus 180, may each include a central processing unit (CPU), a CAN controller, and/or a transceiver (not shown in FIG. 1).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The computing system architecture of the automotive computer 145, VCU 165, and/or the collaborative jamming detection system 107 may omit certain computing modules. It should be readily understood that the computing environment depicted in FIG. 1 is an example of a possible implementation according to the present disclosure, and thus, it should not be considered limiting or exclusive.

As introduced above, In LTE-V2X communications, the communication channels can include an Uu interface 108 (base station to vehicle) and the PC5 interface 109 (vehicle to vehicle). The vehicles 105 and 106 may further exchange information with one or more roadside units (RSUs) 111 the PC5 interface 109, and roadside units (RSUs) 111 may further exchange information with Base Station 110 using the Uu interface 108.

While the Uu interface 108 may be controlled by and/or communicate with a base station 110, there may be no centralized control for the PC5 interface 109, which is shared by surrounding vehicles (e.g., the vehicles 105 and 106) and roadside units (RSUs) 111. Before transmitting any message over the PC5 interface 109, each of the connected vehicles 105 and 106 that intends to transmit a communication over the interface 109 may sense the channel (PC5 interface 109) to check whether it is being used by other vehicles or connected infrastructure. If it is determined that the channel (PC5 interface 109) is used by other device(s), then the transmitting vehicle would defer its transmission until a time at which the channel associated with the PC5 interface 109 becomes free or try to find another available PC5 channel resource block(s) 109 for the transmission.

The multiple local jamming reports from the any nearby RSUs (e.g., the RSU 111) and/or vehicles 105 and/or 106 that may be passing the stationary jammer can serve to alert the collaborative jamming detection system 107 of a stationary jamming device.

In some aspects, the RSU 111 may listen for signal traffic on the PC5 interface as well as transmit info through the PC5 interface to vehicles (e.g., the PC5 interface 109 as depicted in FIG. 1). Therefore, the vehicles 105 and/or 106 may report potential jamming information through the Uu to base station 110 (depicted in FIG. 1, for example), but also the RSU 111 may report potential jamming to the base station 110 through the Uu interface 108.

A selfish or malicious attacker will be consequently able to occupy the channel interface by constantly transmitting, which is broadly defined as a term "jamming". In some cases where a malicious attacker has occupied a channel with a jamming attack, the channel may never become free, and the transmitting vehicle may not be able to send the communication.

In most cases, the wireless coverage of the Uu interface 108 is implemented using the base station 110, and thus, has a coverage that is significantly larger than the coverage associated with any of the PC5 interface(s) 109. Accordingly, it may be advantageous to detect Uu jamming by the base station 110. By collaboratively receiving local jamming information from the PC5 interface-connected vehicles 105 and 106, the collaborative jamming detection system 107 may detect local jamming over the PC5 interface 109 in a collaborative manner.

Figure 2:
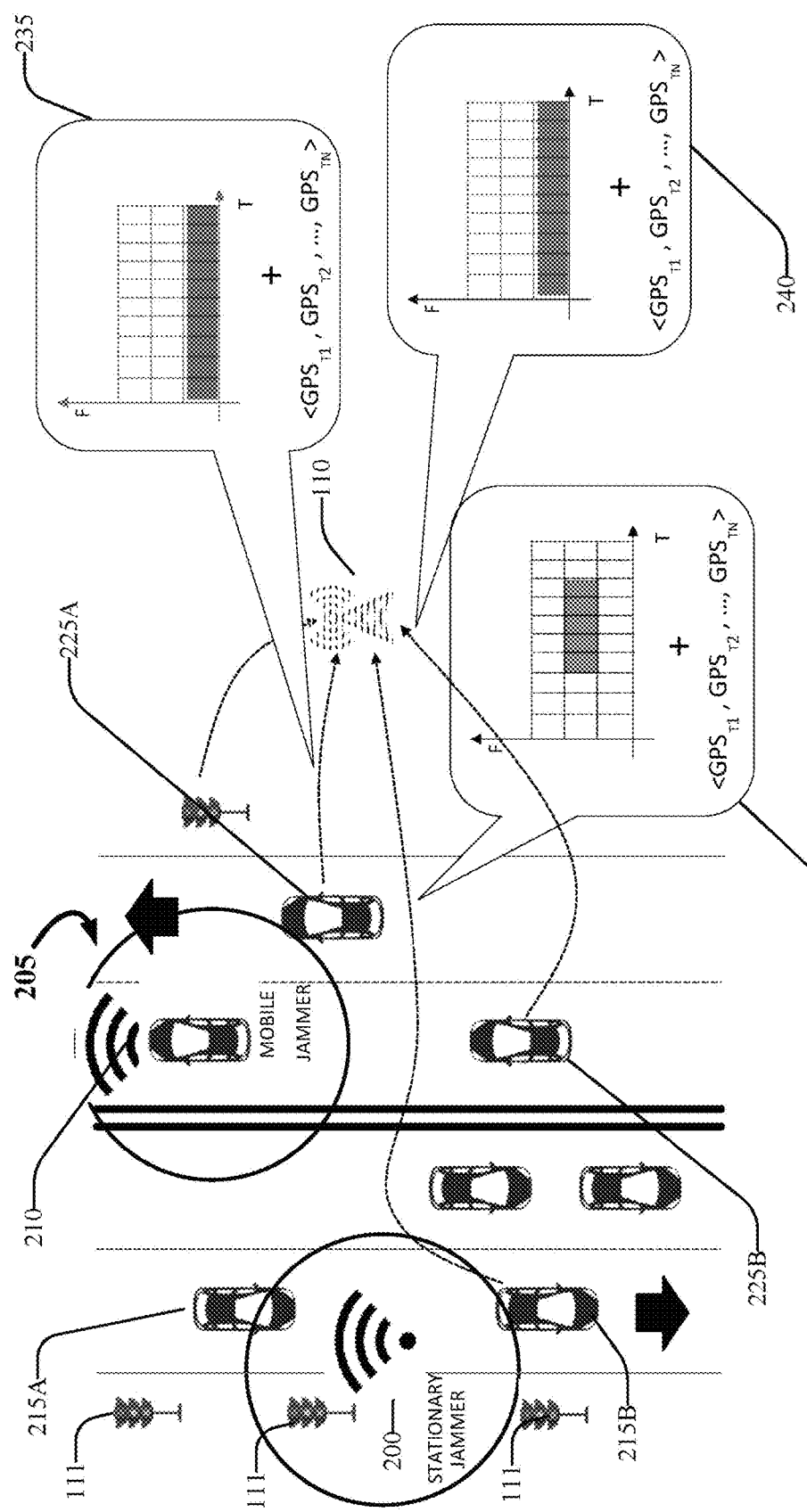
FIG. 2 illustrates local jamming detection in accordance with the present disclosure.

FIG. 2 illustrates local jamming detection using a base station 110, in accordance with the present disclosure. A stationary jammer 200 is depicted in FIG. 2 disposed at a roadside position proximate to a plurality of vehicles 205. A stationary jammer 200 may be a device or series of devices that transmit a jamming signal that occupies a PC5 interface channel (e.g., a channel associated with the PC5 interface 109 as shown in FIG. 1) such that legitimate V2V communications may not use the jammed PC5 interface 109 channel. The vehicles proximate to the stationary jammer 200 may experience an inability to use the PC5 interface 109 channel when those vehicles approach the stationary jammer 200 as they travel on the roadway. For example, a vehicle 215A and 215B may be unable to transmit or receive useful information on the PC5 interface 109 channel as they enter into the signal transmission area associated with the stationary jammer 200.

A mobile jammer 210 is shown in FIG. 2, where the mobile jammer 210 is traveling with vehicle traffic and changing geographic position with respect to time. Accordingly, vehicles proximate to the mobile jammer 210 (e.g., the vehicles 225A and 225B may experience ongoing (persistent) channel occupancy as they travel nearby the mobile jammer 210. The vehicles 215 and 225 traveling on the roadway may experience persistent or momentary signal jamming associated with their proximity to the stationary jammer 200 and the mobile jammer 210. Although the vehicles 215 and 225 may not be able to connect to each other via the PC5 interface 109 channel, they may still connect with the base station 110 using the Uu interface 108 (as shown in FIG. 1), and submit local jamming information that includes details usable by the base station 110 (and more particularly, usable by the base station server(s) 170 as shown in FIG. 1) to build a global jamming map based on collected reports (e.g., local jamming information 230, 235, and 240) received from the vehicles 215 and 225, respectively.

The local jamming information 230, 235, 240, etc., received from one or more of the vehicles 205 and RSU 111 may be collected and/or received at a base station 110 via the Uu interface 108 (as shown in FIG. 1). Each local jamming information data transmission may respectively include a resource block spectrogram showing observed signal strength in time-frequency space, and GPS coordinate traces corresponding to each resource block.

The collaborative jamming detection system 107 (as shown in FIG. 1) may collect local jamming information 230, 235, 240, etc. from the vehicles and RSUs 111 experiencing connectivity issues due to the malicious attackers. For example, the base station 110 may receive from the first vehicle 215 and/or one or more RSUs 111, local jamming information 230 as the vehicle 215 passes the stationary jammer 200. The base station 110 may further receive the local jamming information 235 and 240 from the second vehicle 225A third vehicle 225B, respectively, as they continue on their trajectory while traveling proximate to the mobile jammer 210. The local jamming information 230, 235, and 240 may respectively include a resource block spectrogram indicative of an observed signal strength in time frequency space. The observed signal strength information may include GPS coordinate data associated with time information. In other aspects, and although not shown in FIG. 2, the local jamming information may further include reporter identification indicative of a unique vehicle and/or user identification. Accordingly, the vehicles reporting the jamming information may be uniquely identified and provide time and location information to the base station 110 that may be usable for generating a global jamming map that identifies an identification of a jamming device or devices, with approximate locations for any type of stationary and/or mobile jammer. For example, according to an embodiment, as the vehicle 215 approaches the stationary jammer 200, while the vehicle 215 is within transmission range of the stationary jammer 200, the PC5 interface 109 channel on which the stationary jammer 200 is transmitting will appear occupied, and thus, may not be used for communication by the vehicle 215.

Figure 3:
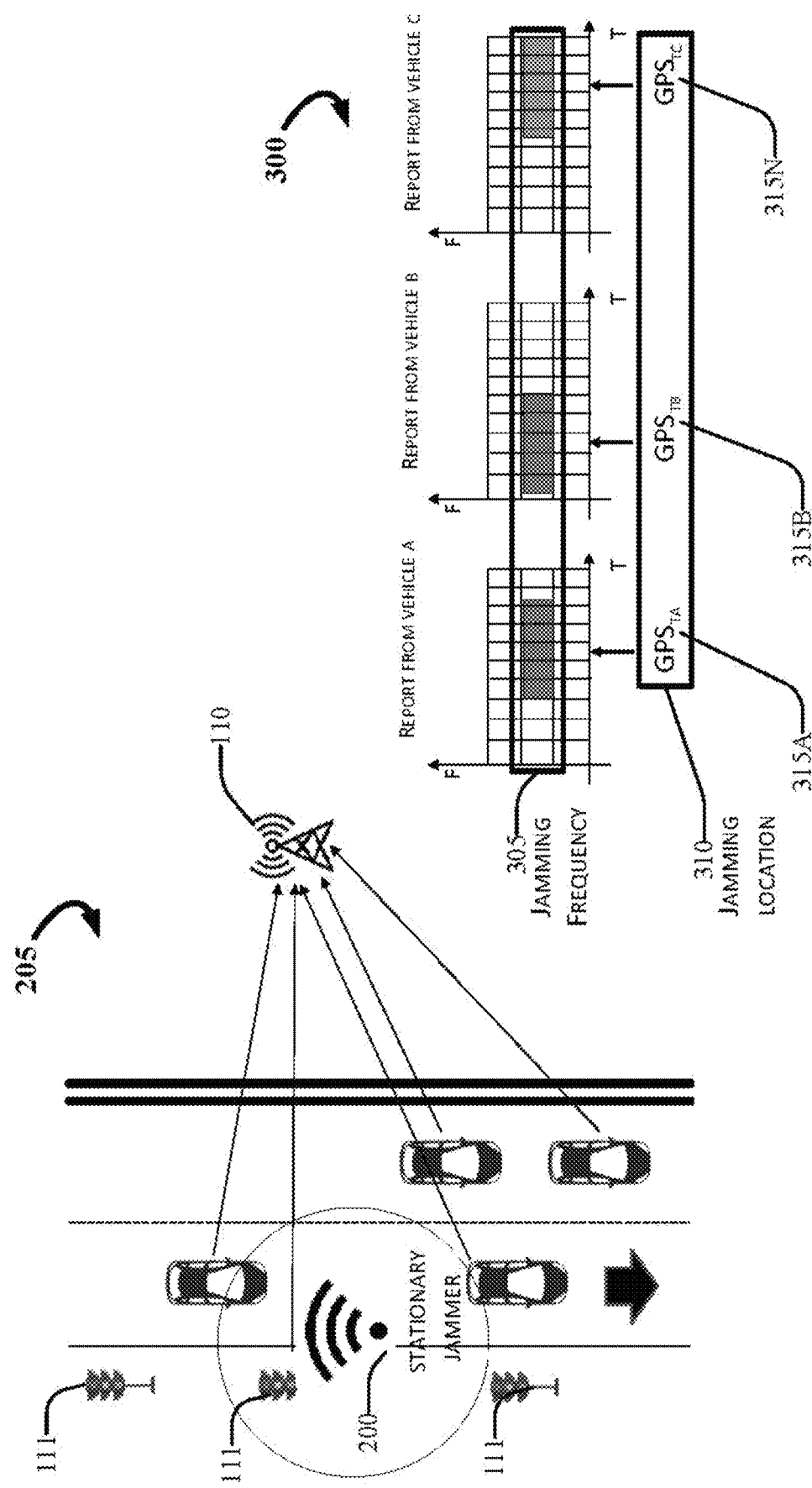
FIG. 3 depicts detecting a stationary jamming device in accordance with the present disclosure.

FIG. 3 depicts detecting the stationary jamming device (stationary jammer 200), in accordance with the present disclosure. The stationary jammer 200 may be disposed in infrastructure that may have been maliciously tampered with, such as a transmitting device disposed nearby the roadway, or positioned in any number of ways such that the stationary jammer 200 does not change position with respect to time, where the jammer's data transmission output may reach communication channels used by vehicles 105 that are within range of the jammer 200 as the vehicles are passing by. The base station 110 may receive a plurality of local mapping information (depicted in FIG. 2) and use the local jamming reports to generate a global jamming map.

Global jamming mapping can include collecting the local jamming information from the vehicles 205 as they pass within range of the stationary jammer 200 and report to the local jamming information to the base station 110. The local jamming reports can include jamming frequency information 305 and jamming location information 310, including attack time and localization information 315A correlated with jamming localization information 315A, 315B, . . . 315N. The multiple local jamming reports from the any nearby roadside units (RSUs) 111 and/or vehicles 205 that may be passing the stationary jammer 200 can serve to alert the collaborative jamming detection system 107 of a stationary jamming device.

The base station 110 may build a global jamming map 300 based on the collected reports. For example, local jamming reports from multiple vehicles pointing to a similar geographical coordinate will likely suggest the location of stationary jammer. For example, multiple jamming reports (Report from Vehicle A, Report from Vehicle B, Report from Vehicle C, Report from RSU A, etc.) from the group of vehicles 205 within a close geographical distance observing persistent channel occupancy will likely suggest the existence of the stationary jammer 200 in the vicinity. The global jamming map 300 can include jamming frequency information 305 in the form of a resource block spectrogram indicative of an observed signal strength in time frequency space. Jamming location information 310 can include a GPS coordinate trace corresponding to the resource block spectrogram shown in the jamming frequency information 305.

Figure 4:
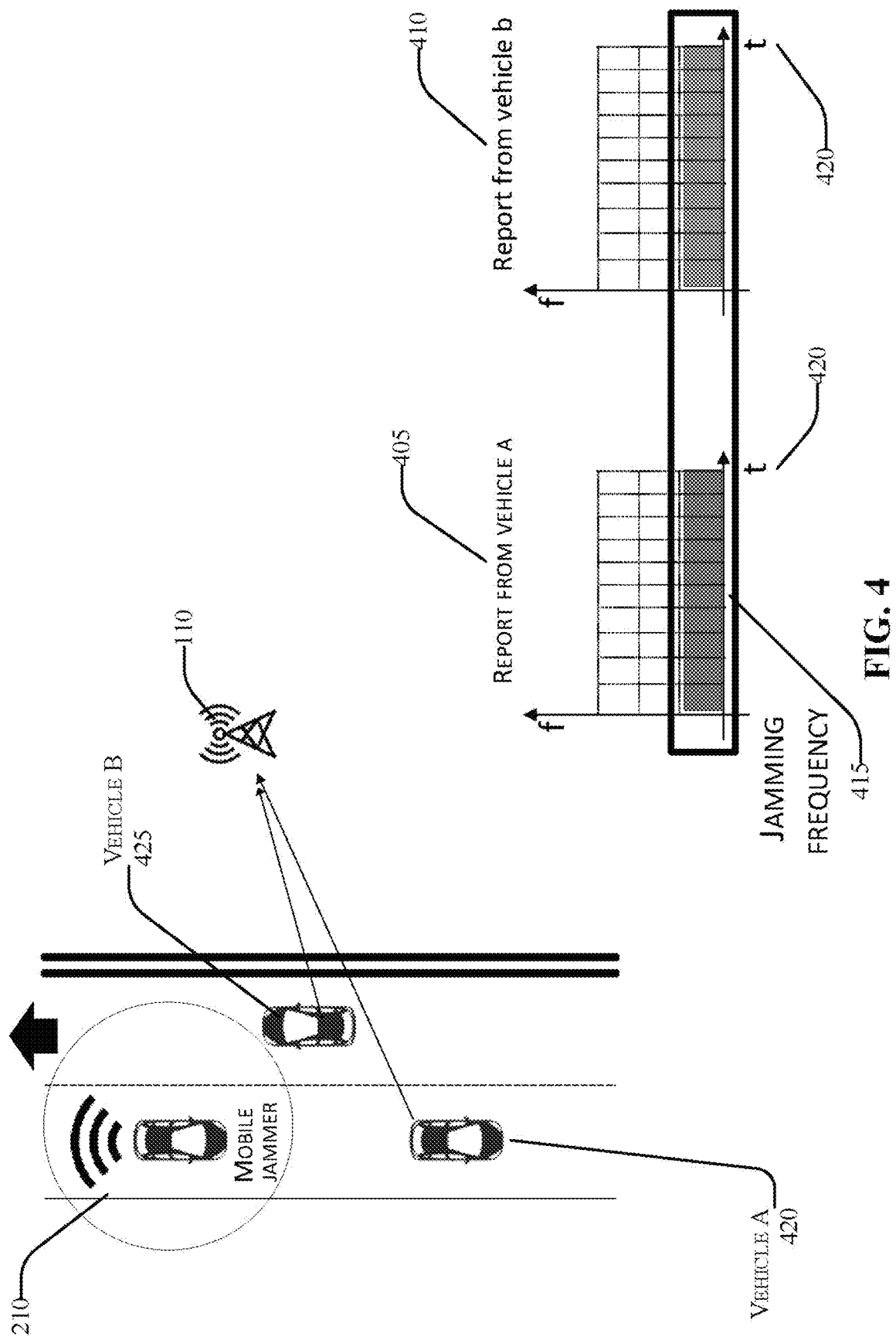
FIG. 4 illustrates detecting a mobile jamming device in accordance with the present disclosure.

FIG. 4 illustrates detecting the mobile jammer 210, in accordance with the present disclosure. The mobile jammer 210 is depicted in FIG. 4 as it changes position by moving with the roadway traffic, and thus, any nearby vehicles such as a vehicle A 420 or a vehicle B 425 may not communicate on the PC5 interface 109 channel on which the mobile jammer 210 is transmitting when those vehicles remain proximate to and within the communication range of the mobile jammer 210.

The multiple jamming reports from the vehicles travelling in the geographically close distance suggest the existence of mobile jammer in the vicinity if they observe that the similar frequency channel is occupied over the longer period than a given threshold. For example, when multiple vehicles (e.g., the vehicle A 420 and the vehicle B 425) report the local transmission jamming information 405 and 410 to the base station 110, that information may also be used to form the global jamming map 300. The global map (not shown in FIG. 4) may include the jamming frequency information 415, among other information such as the attack time information (shown in FIG. 3 as the attack time and localization information 315A correlated with attack time and localization information 315A, 315B, . . . 315N) that indicate similar frequency channel occupation over a period of time that exceeds a threshold for time 420. Any RSU nearby the mobile jammer also could report the potential jamming information to the base station 110.

Figure 5:
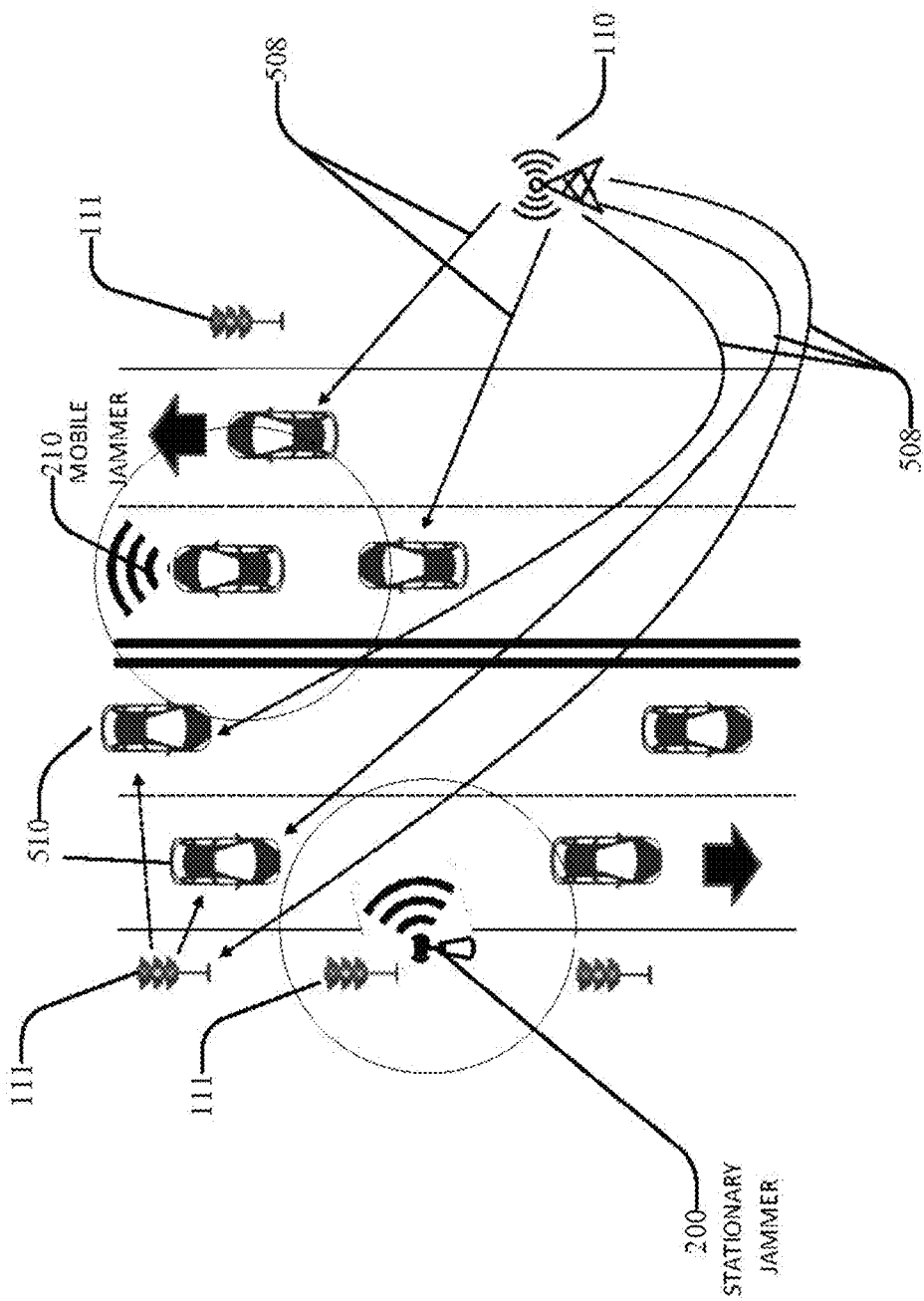
FIG. 5 illustrates disseminating jamming device detection information in accordance with the present disclosure.

FIG. 5 illustrates disseminating jamming device detection information in accordance with the present disclosure. The multiple local jamming information 230, 235, and 240, etc. (as shown in FIG. 2) may be received from the vehicles travelling in the geographically close distance with respect to the mobile jammer 210 and the stationary jammer 200, which may suggest the existence and static or changing locations of the jamming devices, respectively.

The base station 110 may send, to approaching vehicles 510, location information 508 that localizes the stationary jammer 200 and/or the mobile jammer 210. The base station 110 may send the location information 508 to a RSU 111, or to the approaching vehicles 510, so that the approaching vehicles 510 may prepare before entering the jamming coverage area. The RSUs may forward the location information 508 to the approaching vehicles 510, or the base station 110 may send the location information 508 to the vehicles 510 directly.

In some aspects, the base station 110 may also forward the location information 508 to one or more other base stations (not shown in FIG. 5) if needed to extend coverage of the protected geographic area.

Figure 6:
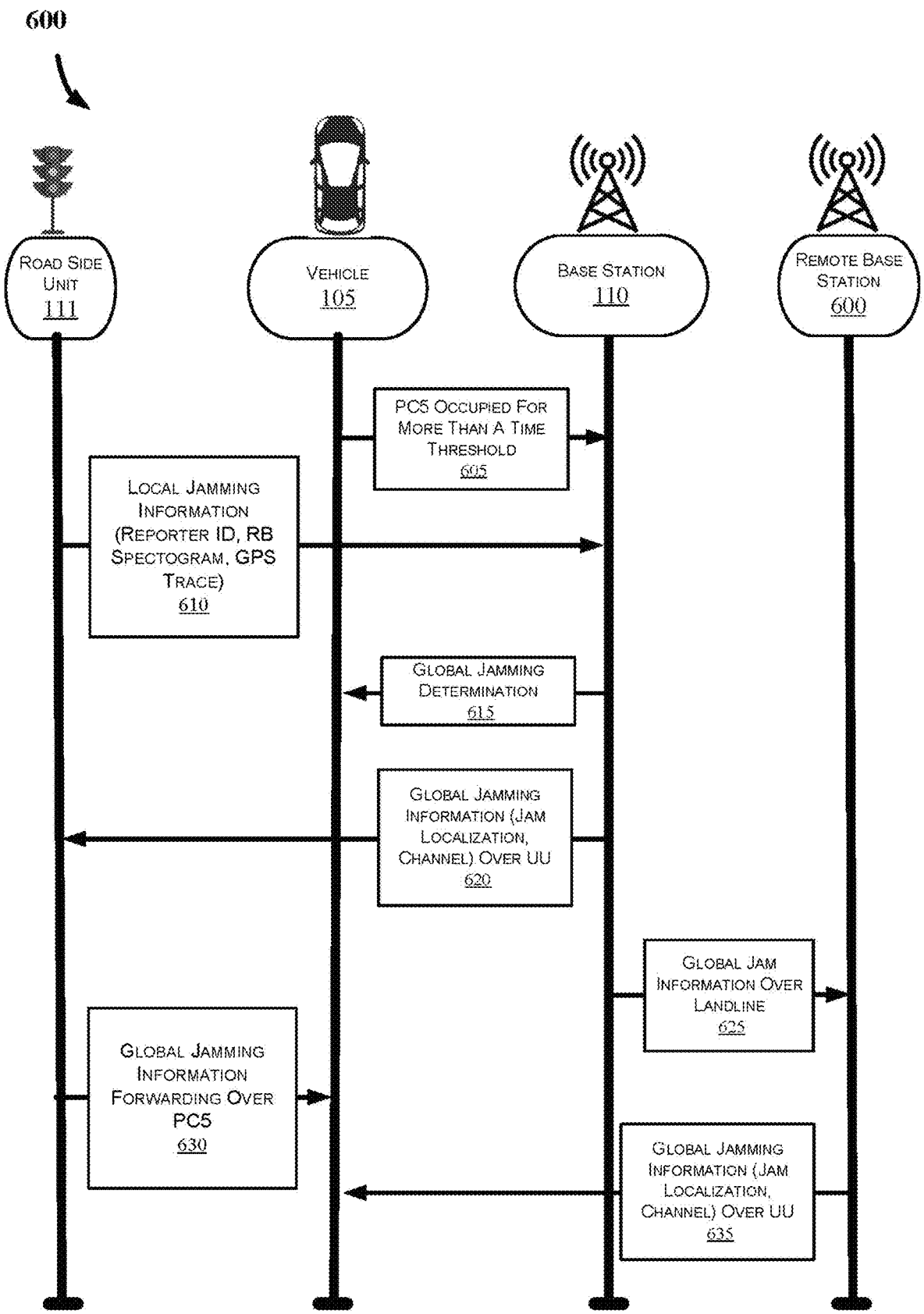
FIG. 6 depicts a mixed flow diagram illustrating a sequence of message dissemination associated with detecting a mobile or stationary jamming device in accordance with the present disclosure.

FIG. 6 depicts a mixed flow diagram illustrating a sequence of message dissemination associated with the RSU 111, the vehicle 105, the base station 110, and a remote base station 600, in accordance with the present disclosure. When the local jamming information 605 is received by the base station 110 from the vehicle 105, among other vehicles not shown in FIG. 6, where the jamming information shows that the PC5 interface 109 channel is occupied for more than a time threshold (e.g., 5 seconds, 10 seconds, 30 seconds, etc.) the base station 110 may be on notice that there may be a jamming device localized in the coverage area. At step 610, the base station 110 may further receive local jamming information from RSUs 111 that can include, for example, a reporter identification (ID) that uniquely identifies a reporting RSU, an RB spectrogram, GPS trace, time information, etc., the base station may generate a global jamming determination 615 based on a global jamming map (not shown in FIG. 6). The global jamming determination 615 may be transmitted to the vehicle 105, and/or the roadside unit 111 as shown in step 620.

In other aspects, the global jam information may be sent to a second remote base station 600 as shown at step 625. In such cases, the remote base station 600 may send the global jamming information to the vehicle 105 over the Uu interface (108 as shown in FIG. 1) at step 635 when the vehicle 105 is within the second remote base station. The vehicle 105 may further receive the global jamming information from the RSU 111 via PC5 interface 109 connection(s) as shown at step 630.

Figure 7:
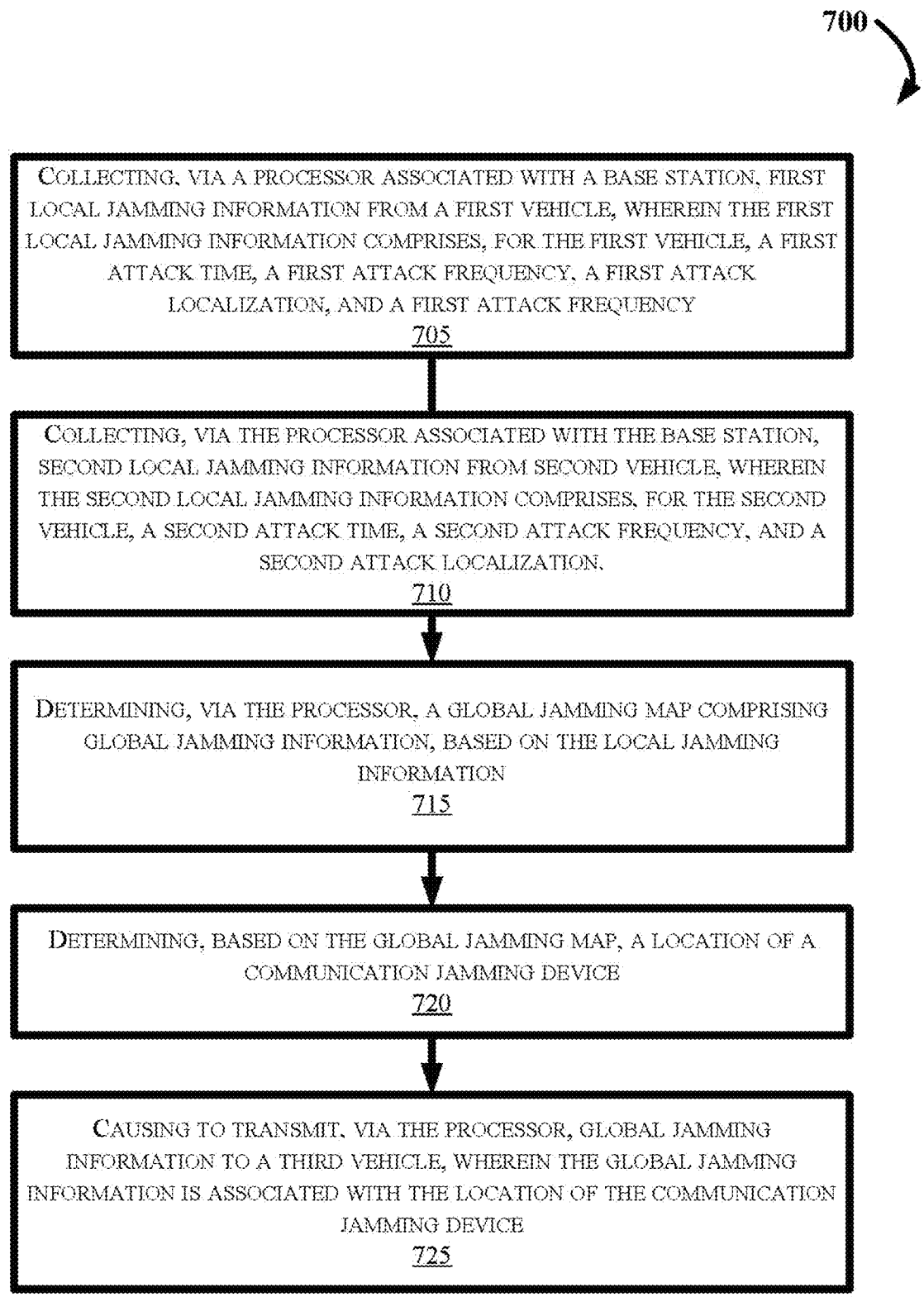
FIG. 7 depicts a flow diagram of an example method for detecting communication jamming attacks in accordance with the present disclosure.

FIG. 7 is a flow diagram of an example method 700 for detecting communication jamming attacks, according to the present disclosure. FIG. 7 may be described with continued reference to prior figures, including FIGS. 1-6. The following process is exemplary and not confined to the steps described hereafter. Moreover, alternative embodiments may include more or less steps that are shown or described herein, and may include these steps in a different order than the order described in the following example embodiments.

Referring first to FIG. 7, at step 705, the method 700 may commence with collecting, via a processor associated with a base station, local jamming information from a first vehicle, wherein the first local jamming information comprises, for the first vehicle, a first attack time, a first attack frequency, a first attack localization, and a first attack frequency. This step may include collecting, from the first vehicle, the local jamming information via a Uu interface communication channel. In some aspects, the first local jamming information may include a first resource block spectrogram indicative of an observed first signal strength in time-frequency space.

At step 710, the method 700 may further include collecting, via the processor associated with the base station, second local jamming information from second vehicle, wherein the second local jamming information comprises, for the second vehicle, a second attack time, a second attack frequency, a second attack localization, and a second attack frequency. This step may include collecting, from the second vehicle, the local jamming information via the Uu interface communication channel. In some aspects, the second local jamming information may include a second resource block spectrogram indicative of an observed first signal strength in time-frequency space. In some aspects, the RSU (e.g., a traffic signal) may detect PC5 and report potential jamming.

At step 715, the method 700 may further include determining, via the processor, a global jamming map comprising global jamming information, based on the local jamming information. The local jamming information can include a resource block spectrogram indicative of an observed signal strength in time-frequency space, and may further include a GPS coordinate trace corresponding to the resource block spectrogram. In other aspects, the local jamming information may include a reporter ID indicative of a unique identifying information associated with the sending vehicle or device. Accordingly, the location of the communication jamming device, and a channel of a communication jamming attack.

At step 720, the method 700 may further include determining, based on the global jamming map, a location of a communication jamming device. This step may include determining information associated with the location of the communication jamming device, and a channel of a communication jamming attack.

At step 725, the method 700 may further include causing to transmit, via the processor, global jamming information to a third vehicle, wherein the global jamming information is associated with the location of the communication jamming device. This step may include transmitting the global jamming information to the first vehicle, the second vehicle, and a third vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for detecting communication jamming attacks, comprising:
   collecting, via a processor associated with a base station, first local jamming information from a first vehicle, wherein the first local jamming information comprises, for the first vehicle, a first attack time, a first attack frequency, a first attack localization, and a first attack frequency;
   collecting, via the processor associated with the base station, second local jamming information from second vehicle, wherein the second local jamming information comprises, for the second vehicle, a second attack time, a second attack frequency, and a second attack localization;
   determining, via the processor, a global jamming map comprising global jamming information, based on the first local jamming information and the second local jamming information;
   determining, based on the global jamming map, a communication jamming device location; and
   causing to transmit, via the processor, global jamming information to a third vehicle, wherein the global jamming information is associated with the communication jamming device location.

2. The method according to claim 1,
   wherein the first local jamming information comprises a first resource block spectrogram indicative of an observed first signal strength in time-frequency space; and
   wherein the second local jamming information comprises a second resource block spectrogram indicative of an observed second signal strength in time-frequency space.

3. The method according to claim 2,
   wherein the first local jamming information further comprises a first reporter identification; and
   wherein the second local jamming information further comprises a second reporter identification comprising a unique identification associated with the second vehicle.

4. The method according to claim 2,
   wherein the first local jamming information comprises a first GPS coordinate trace corresponding to the first resource block spectrogram; and
   wherein the second local jamming information comprises a second GPS coordinate trace corresponding to the second resource block spectrogram.

5. The method according to claim 1, wherein the global jamming information comprises information indicative of the communication jamming device location and a communication jamming attack channel.

6. The method according to claim 1, wherein causing to transmit the global jamming information to the third vehicle comprises:
   transmitting a location of a stationary or mobile jamming device.

7. The method according to claim 1, wherein collecting the local jamming information from the first vehicle and the second vehicle comprises:
   collecting the first local jamming information via a Universal Mobile Telecommunications System (UMTS) Air Interface communication channel; and
   collecting the second local jamming information via the UMTS Air Interface communication channel interface communication channel.

8. A system, comprising:
   a processor; and
   a memory for storing executable instructions, the processor programmed to execute the instructions to:
      collect first local jamming information at a base station from a first vehicle, wherein the first local jamming information comprises, for the first vehicle, a first attack time, a first attack frequency, a first attack localization, and a first attack frequency;

collect second local jamming information from a second vehicle, wherein the second local jamming information comprises, for the second vehicle, a second attack time, a second attack frequency, and a second attack localization;

determine a global jamming map comprising global jamming information, based on the first local jamming information and the second local jamming information;

determine, based on the global jamming map, a communication jamming device location; and cause to transmit, via the processor, global jamming information to a third vehicle, wherein the global jamming information is associated with the communication jamming device location.

9. The system according to claim 8, wherein the first local jamming information comprises a first resource block spectrogram indicative of an observed signal strength in time-frequency space; and wherein the second local jamming information comprises a second resource block spectrogram indicative of an observed second signal strength in time-frequency space.

10. The system according to claim 9, wherein the first local jamming information comprises a reporter identification; and wherein the second local jamming information comprises a second GPS coordinate trace corresponding to the second resource block spectrogram.

11. The system according to claim 9, wherein the first local jamming information further comprises a first GPS coordinate trace corresponding to the resource block spectrogram; and wherein the first local jamming information further comprises a first GPS coordinate trace corresponding to the resource block spectrogram.

12. The system according to claim 8, wherein the global jamming information comprises information indicative of the communication jamming device location, and a communication jamming attack channel.

13. The system according to claim 8, wherein the processor is further programmed to cause to transmit a location of a stationary or mobile jamming device.

14. The system according to claim 8, wherein the processor is further programmed to collect the local jamming information from the first vehicle and the second vehicle by executing the instructions to:

collect the first local jamming information via a PC5 interface communication channel; and collect the second local jamming information via the PC5 interface communication channel.

15. A non-transitory computer-readable storage medium, the computer-readable storage medium having instructions stored thereupon which, when executed by a processor, cause the processor to:

collect first local jamming information at a base station from a first vehicle, wherein the first local jamming information comprises, for the first vehicle, a first attack time, a first attack frequency, a first attack localization, and a first attack frequency;

collect second local jamming information from a second vehicle, wherein the second local jamming information comprises, for the second vehicle, a second attack time, a second attack frequency, and a second attack localization;

determine a global jamming map comprising global jamming information, based on the first local jamming information and the second local jamming information;

determine, based on the global jamming map, a communication jamming device location; and cause to transmit, via the processor, global jamming information to a third vehicle, wherein the global jamming information is associated with the communication jamming device location.

16. The non-transitory computer-readable storage medium according to claim 15, wherein the first local jamming information comprises a first resource block spectrogram indicative of an observed signal strength in time-frequency space; and wherein the second local jamming information comprises a second resource block spectrogram indicative of an observed first signal strength in time-frequency space.

17. The non-transitory computer-readable storage medium according to claim 15, wherein the first local jamming information comprises a first reporter identification comprising a unique identification associated with the first vehicle; and wherein the second local jamming information comprises a second reporter identification comprising a unique identification associated with the second vehicle.

18. The non-transitory computer-readable storage medium according to claim 16, wherein the first local jamming information further comprises a first GPS coordinate trace corresponding to the first resource block spectrogram; and wherein the second local jamming information further comprises a second GPS coordinate trace corresponding to the second resource block spectrogram.

19. The non-transitory computer-readable storage medium according to claim 15, wherein the global jamming information comprises information indicative of the communication jamming device location, and a communication jamming attack channel.

20. The non-transitory computer-readable storage medium according to claim 15, having further instructions stored thereupon to:

cause to transmit the global jamming information to the third vehicle.

* * * * *